Feb. 15, 1927. 1,617,735
A. C. ALVAREZ
WIRE FASTENER
Filed April 1, 1924

INVENTOR.
Arthur C. Alvarez
BY
Miller Henry & Boykeu
ATTORNEYS

Patented Feb. 15, 1927.

1,617,735

UNITED STATES PATENT OFFICE.

ARTHUR C. ALVAREZ, OF BERKELEY, CALIFORNIA.

WIRE FASTENER.

Application filed April 1, 1924. Serial No. 703,540.

My invention has for its object fastening means to be employed for attaching wire, or wire netting, mesh or fabric to a wall or wooden structure as conventional wooden sheathing in buildings for the purpose of holding and spacing the mesh to which the mortar coating may be readily applied and thereafter held, and is particularly applicable in building construction.

Other objects will appear from the drawings and specifications which follow:

These objects I accomplish by striking up from a metallic strip, a sinuously shaped member having aligned holes through its center and two end sections and having one of its upstanding portions formed as a thrust to resist compression. It is applied by placing or hooking the opposite end portion over the wire which it is desired to hold and which is then retained in a loop opposite to the thrust portion of the sinuous member and then a nail or suitable fastening means is passed through the aligned holes and driven into the wooden sheathing or wall or other support, until the said loop is flattened down and the wire pinched therebetween.

The strut or trussed portion due to its resistance to compresssion, during the fixing and driving of the nail, retains its upstanding relation thus properly spacing the wire from the surface to which the fastener is attached.

By referring to the accompanying drawings my invention will be made clear.

Throughout the figures similar numerals refer to identical parts.

Figure 8:
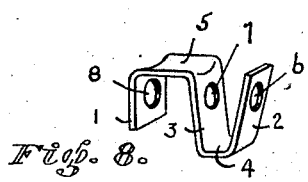
Fig. 8 is a perspective view of the fastener before the nail and wire are inserted therein.

My fastener consists primarily of a metal strip bent, formed and punched as shown in Fig. 8, wherein there is a leaf forming a top indicated by the numeral 2, and an intermediate leaf 3, a loop portion 4 and a compression strut 5. Holes 6, 7, 8, in alignment with each other are punched respectively in members 2, 3, 1.

The strut 5 is formed with a concave or other reinforced or trussed section adapted to resist bending, crushing or other distortion, when the leaf 2 is driven towards the intermediate portion 3 when the fastening means is passed through the holes and driven into the sheathing.

Figure 1:
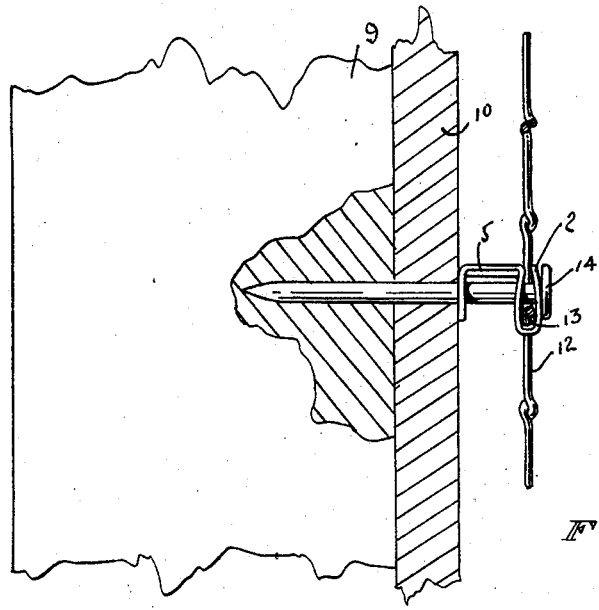
Fig. 1 is a side view of a conventional wall portion showing the studding and sheathing with one of my fasteners in place supporting wire mesh in space relation with said wall, and before the plaster or cement is applied.
Figure 2:
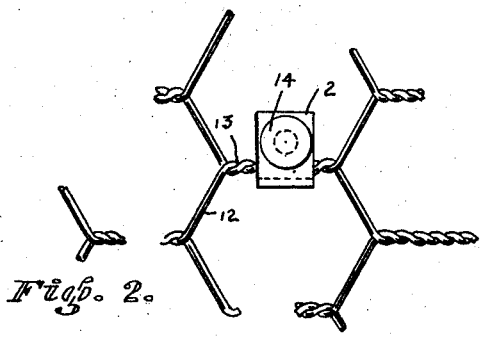
Fig. 2 is a front view of Fig. 1.
Figure 3:
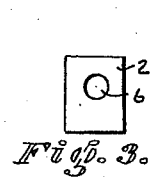
Figs. 3, 4, 5 are end, side and plan views respectively, of my fastener.
Figure 4:
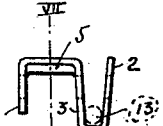
Figure 5:
Figure 6:
Fig. 6 is a cross section of Fig. 5 on the line VI—VI.
Figure 7:
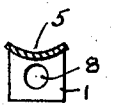
Fig. 7 is a cross section of Fig. 4 on the line VII—VII.

Referring particularly to Fig. 1, numeral 9 indicates studding and at 10 is shown ordinary wood sheathing as employed in conventional building construction.

The fastener of Fig. 8 is hooked at 4 over a section of wire netting 13. A nail 14 is now driven through the aligned holes of the fastener and through the sheathing, and if desired into the studding 9, the top member 2 is thereby pinched about the wire 13 without distorting the strut portion 5 which thus retains the spaced relation between the wire mesh and sheathing.

For ordinary buidling construction I have found that fasteners formed of 22 gauge steel strip 3/8" wide and having the strut or concave portion 5, 5/16" high with aligned holes substantially 11/64" in diameter to be well suited for ordinary wire netting.

I claim:

1. A fastener for wire comprising a strip of sinuous form having a base, leg at right angles thereto of trussed form and a looped portion extending on the opposite side of said leg, holes through the looped portion and the base adapted to pass fastening means therethrough.

2. A fastener for wire comprising a strip of sinuous form having a base, leg at right angles thereto of trussed form and a looped portion extending on the opposite side of said leg, holes through the looped portion and the base adapted to pass fastening means therethrough and fastening means extending through the said holes and adapted to engage a support.

3. A fastener for wire comprising a strip of sinuous form having a base, a leg at right angles thereto of curved cross section and a looped portion extending on the opposite side of said leg, holes through the looped portion and the base adapted to pass fastening means therethrough.

4. A fastener for wire comprising a strip of sinuous form having a base, a leg at right angles thereto of curved cross section and a looped portion extending on the opposite side of said leg, holes through the looped portion and the base adapted to pass fastening means therethrough and fastening means extending through the said holes and adapted to engage a support.

5. As an article of manufacture a fastener for wire struck up from a single piece of metal comprising a base, a leg at right angles thereto of trussed cross section, a loop portion extending from the other end of said leg, holes through the looped portion and the base adapted to pass fastening means therethrough.

6. As an article of manufacture a fastener for wire struck up from a single piece of metal comprising a base, a leg at right angles thereto of curved cross section, a loop portion extending from the other end of the said leg holes through the looped portion and the base adapted to pass fastening means therethrough.

7. In means of the character described, a spacing clip embodying a supporting base disposed in a horizontal plane, a spacing member supported by said supporting base and disposed in a vertical plane, a lath seat supported by said spacing member and disposed in a horizontal plane, and a clinching cap overhanging said lath seat and supported thereby, said clinching cap cooperable with said lath seat for confining a lath wire therebetween.

ARTHUR C. ALVAREZ.